April 6, 1926.  
V. WILLOUGHBY  
1,579,271  
DUST GUARD FOR JOURNAL BOXES  
Filed May 11, 1925
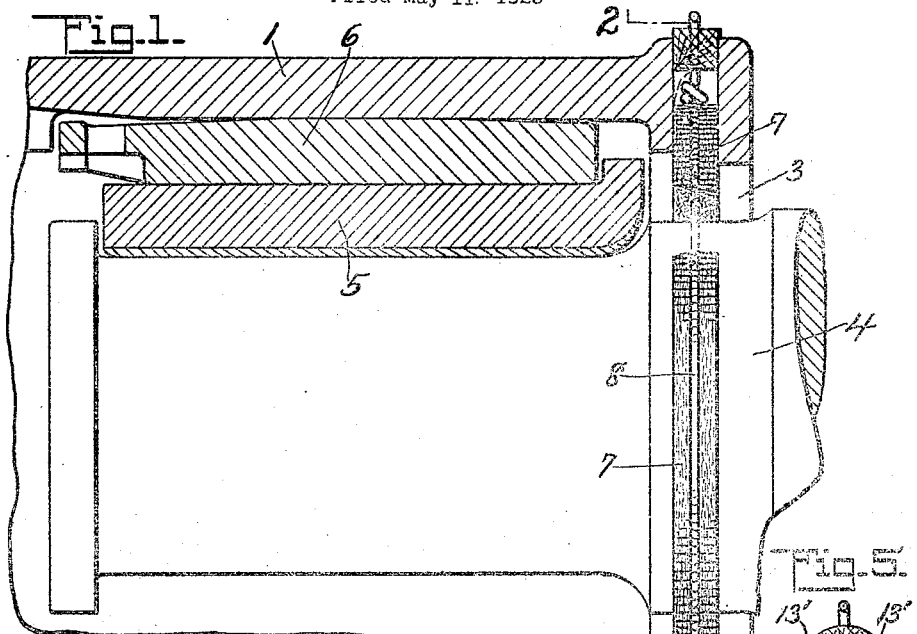
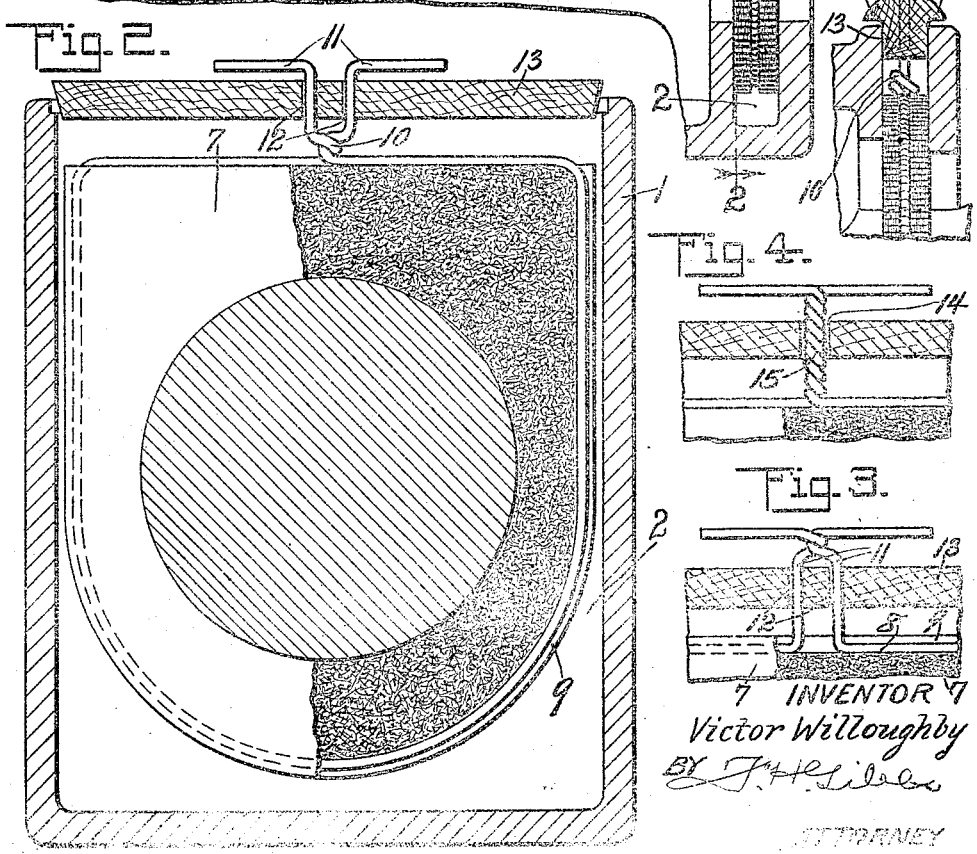
INVENTOR  
Victor Willoughby Patented Apr. 6, 1926.

1,579,271

UNITED STATES PATENT OFFICE.

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY.

DUST GUARD FOR JOURNAL BOXES.

Application filed May 11, 1925. Serial No. 29,461.

*To all whom it may concern:*

Be it known that I, VICTOR WILLOUGHBY, residing at Ridgewood, Bergen County, New Jersey, and being a citizen of the United States, have invented certain new and useful Improvements in Dust Guards for Journal Boxes, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a fragmentary sectional view through a journal box with an axle journal extending into the journal box and showing the improved dust guard in place;

Fig. 2 is a vertical transverse sectional view taken along line 2—2 of Fig. 1, the dust guard being shown partly in section;

Fig. 3 is a fragmentary sectional view showing the manner of securing a dust guard supporting yoke;

Fig. 4 is a view similar to Fig. 3 showing a slightly modified manner of securing and tightening the dust guard supporting yoke and Fig. 5 is a fragmentary sectional view showing a slightly modified form of yoke supporting strip.

An object of this invention is to provide an improved dust guard for use in railroad journal boxes and to provide a dust guard which will be light in weight, strong and durable and not liable to split when a train is moved along a rough section of track.

Another object of the invention is to provide a dust guard which will not become misshapen upon absorbing lubricant and which will not be liable to be warped by heat or cold.

Another object of the invention is to provide a dust guard which can be formed from sugar cane stalk after the cane has been passed through a mill thereby permitting the dust guard to be made from a material which may be obtained cheaply and which is of such a nature as to permit of readily manufacturing the dust guards in quantities by an inexpensive process.

Referring to the drawing the numeral 1 indicates a journal box which is of a conventional construction and provided at its inner end with the usual dust guard chamber 2 disposed about the opening 3 through which the axle journal 4 extends into the journal box. 5 indicates the usual journal engaging brass and 6 indicates the usual wedge positioned between the brass and the top of the journal box.

The dust guard 7 is of the usual shape and fits into the dust guard chamber 2 where it is supported by a yoke or wire 8 which extends about the dust guard, lying in the groove 9 formed in the peripheral face of the guard, and has its end portions twisted together as shown at 10 in Figs. 2 and 5. The ends 11 of the wire 8 are then directed upwardly through openings 12 in the strip 13 and are bent to extend longitudinally of the strip, as shown in Fig. 2, so that this strip which closes the upper end of the dust guard chamber may serve to support the yoke and dust guard in the dust guard chamber. This strip 13 may be formed in cross section as shown in Fig. 1 or it may be formed as shown in Fig. 5 and provided with side extensions 13' which will prevent movement of the strip into the dust guard chamber beyond a desired amount. If desired the wire 8 may have its end portions projected upwardly through the openings 12 in the strip 13 before being twisted together as shown in Fig. 3 or the wire may have its end portions 11 projected upwardly through a single enlarged opening 14 and twisted together, as shown at 15, with its extreme end portions extending in opposite directions as shown in Fig. 4. This permits the wire to be drawn very tightly about the dust guard so that the wire will serve to reinforce the guard as well as serve to support the guard in the dust guard chamber and secure the strip 13 in position when the journal box is in use.

The dust guard 7 is preferably formed of sugar cane stalks or similar fibrous cellular material reduced to a pulp and molded to shape. In service, a dust guard, formed of the material described, is very effective as it is not warped or cracked by temperature changes and is of such strength as to resist splitting under the shocks of service.

While the use of the refuse of the sugar cane is preferred, it will be understood that other fibrous materials, such as cornstalks or wood, which can be pulped and molded into shape, may be used and it will also be understood that instead of molding the pulp into the desired shape, sheets may be formed of the pulp and the dust guards cut or stamped from the sheets.

What is claimed is:

1. A journal box having a dust guard chamber, a dust guard in said chamber having a partly grooved periphery, a closure for said chamber and a yoke mounted in the groove in said dust guard, said yoke entirely surrounding said dust guard and engaging in an opening in said closure.

2. A journal box having a dust guard chamber, a dust guard in said chamber having a partially grooved periphery, a closure for said chamber and a wire loop entirely surrounding said dust guard and being secured in said groove and engaging in an opening in said closure to secure said closure in position.

3. In combination, a journal box having a dust guard chamber, a dust guard in said chamber having a partly grooved periphery, a perforated closure for said chamber, a wire loop entirely surrounding said dust guard passing thence through the closure, and the end portions of the wire of said loop being spread apart.

In witness whereof I have hereunto set my hand.

VICTOR WILLOUGHBY.